(12) United States Patent
Chikaraishi

(10) Patent No.: US 12,135,124 B2
(45) Date of Patent: Nov. 5, 2024

(54) POWER TOOL ATTACHMENT AND DUST COLLECTION SYSTEM

(71) Applicant: MAKITA CORPORATION, Anjo (JP)

(72) Inventor: Makoto Chikaraishi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/244,674

(22) Filed: Sep. 11, 2023

(65) Prior Publication Data
US 2024/0151390 A1 May 9, 2024

(30) Foreign Application Priority Data
Nov. 4, 2022 (JP) ................................ 2022-177511

(51) Int. Cl.
| | | |
|---|---|---|
| F21V 33/00 | (2006.01) | |
| B25D 16/00 | (2006.01) | |
| B25D 17/20 | (2006.01) | |
| B25F 5/00 | (2006.01) | |
| F21V 8/00 | (2006.01) | |
| G02B 1/04 | (2006.01) | |

(52) U.S. Cl.
CPC ................ F21V 33/00 (2013.01); B25F 5/00 (2013.01); G02B 1/045 (2013.01); G02B 6/0008 (2013.01); B25D 16/00 (2013.01); B25D 17/20 (2013.01)

(58) Field of Classification Search
CPC ........... B25F 5/00; F21V 33/00; G02B 1/045; G02B 6/0008; B25D 16/00; B25D 17/20
See application file for complete search history.

(56) References Cited

U.S. PATENT DOCUMENTS

| | | | | |
|---|---|---|---|---|
| 6,851,898 B2 * | 2/2005 | Ege | ..................... | B23Q 11/0046 408/67 |
| 7,069,662 B2 * | 7/2006 | Fung | ..................... | B25H 1/0085 33/366.24 |
| 7,815,356 B2 * | 10/2010 | Lutz | ........................ | B25F 5/021 362/572 |
| 9,328,915 B2 * | 5/2016 | Vanko | ..................... | B25F 5/021 |
| 11,480,330 B2 * | 10/2022 | Ishikawa | ............... | G02B 6/0008 |
| 2006/0104085 A1 * | 5/2006 | Walker | ................ | B25B 23/0021 362/120 |
| 2006/0262519 A1 * | 11/2006 | Hirschburger | .......... | B25F 5/021 362/119 |

FOREIGN PATENT DOCUMENTS

JP 2019-181605 A 10/2019

* cited by examiner

Primary Examiner — Arman B Fallahkhair

(74) Attorney, Agent, or Firm — Oliff PLC

(57) ABSTRACT

A power tool attachment efficiently guides light and provides sufficient illumination when attached to a power tool. A power tool attachment is attachable to a power tool to cover a light source included in the power tool. The power tool attachment includes a light guide being a single member made of a transparent resin. The light guide includes a light receiver that receives light from the light source when the power tool attachment is attached to the power tool, and a light emitter that outputs the received light.

20 Claims, 13 Drawing Sheets

POWER TOOL ATTACHMENT AND DUST COLLECTION SYSTEM

CROSS-REFERENCE TO RELATED APPLICATIONS

This application claims the benefit of priority to Japanese Patent Application No. 2022-177511, filed on Nov. 4, 2022, the entire contents of which are hereby incorporated by reference.

BACKGROUND

1. Technical Field

The present invention relates to a power tool attachment attachable to a power tool such as an electric drill and a hammer drill, and to a dust collection system with the power tool attachment.

2. Description of the Background

An attachment may be used for a power tool such as an electric drill and a hammer drill. For example, dust collection attachments for collecting dust generated from a workpiece during an operation such as drilling are known as power tool attachments. Air containing dust is sucked into a body case of the dust collection attachment and passes through a filter located in a dust collector such as a dust box. The filter captures and stores the dust into the dust collector.

A power tool may include a light on its front surface to illuminate ahead of a tip tool. However, the dust collection attachment is typically attached to the front surface of the power tool and may cover the light.

In response to the above circumstances, the structure described in Japanese Unexamined Patent Application Publication No. 2019-181605 (hereafter, Patent Literature 1) includes a body case in a dust collection attachment including an optical fiber cable for guiding light from a light source toward the front surface and outputting the light frontward when the attachment is attached to a hammer drill being a power tool.

BRIEF SUMMARY

The optical fiber cable described in Patent Literature 1 cannot efficiently guide light due to the transmission loss in the cable. The dust collection attachment thus cannot provide sufficient illumination.

One or more aspects of the present disclosure are directed to a power tool attachment that is attachable to a power tool to efficiently guide light and provide sufficient illumination, and to a dust collection system.

A first aspect of the present disclosure provides a power tool attachment attachable to a power tool to cover a light source included in the power tool, the power tool attachment including:
- a light guide being a single member made of a transparent resin, the light guide including
  - a light receiver configured to receive light from the light source when the power tool attachment is attached to the power tool, and
  - a light emitter configured to output the received light.

A second aspect of the present disclosure provides a dust collection system, including:
- a power tool including a light source; and
- the above power tool attachment attached to the power tool and covering the light source.

The structure according to the above aspects of the present disclosure is attachable to a power tool to efficiently guide light and provide sufficient illumination.

DETAILED DESCRIPTION

Embodiments of the present disclosure will now be described with reference to the drawings.

Figure 1:
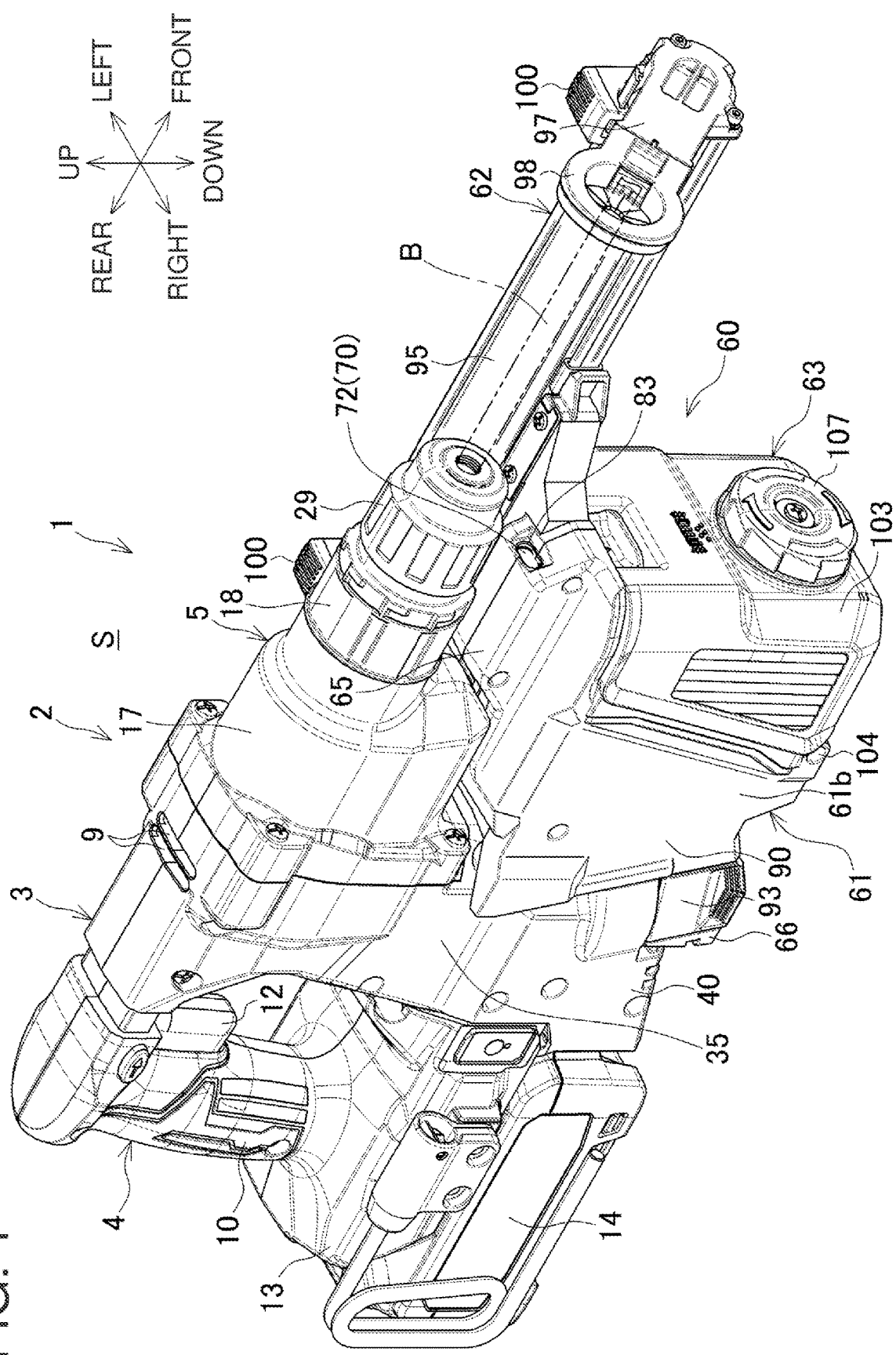
FIG. 1 is a front perspective view of a dust collection system with a dust collection attachment attached to a hammer drill.
Figure 2:
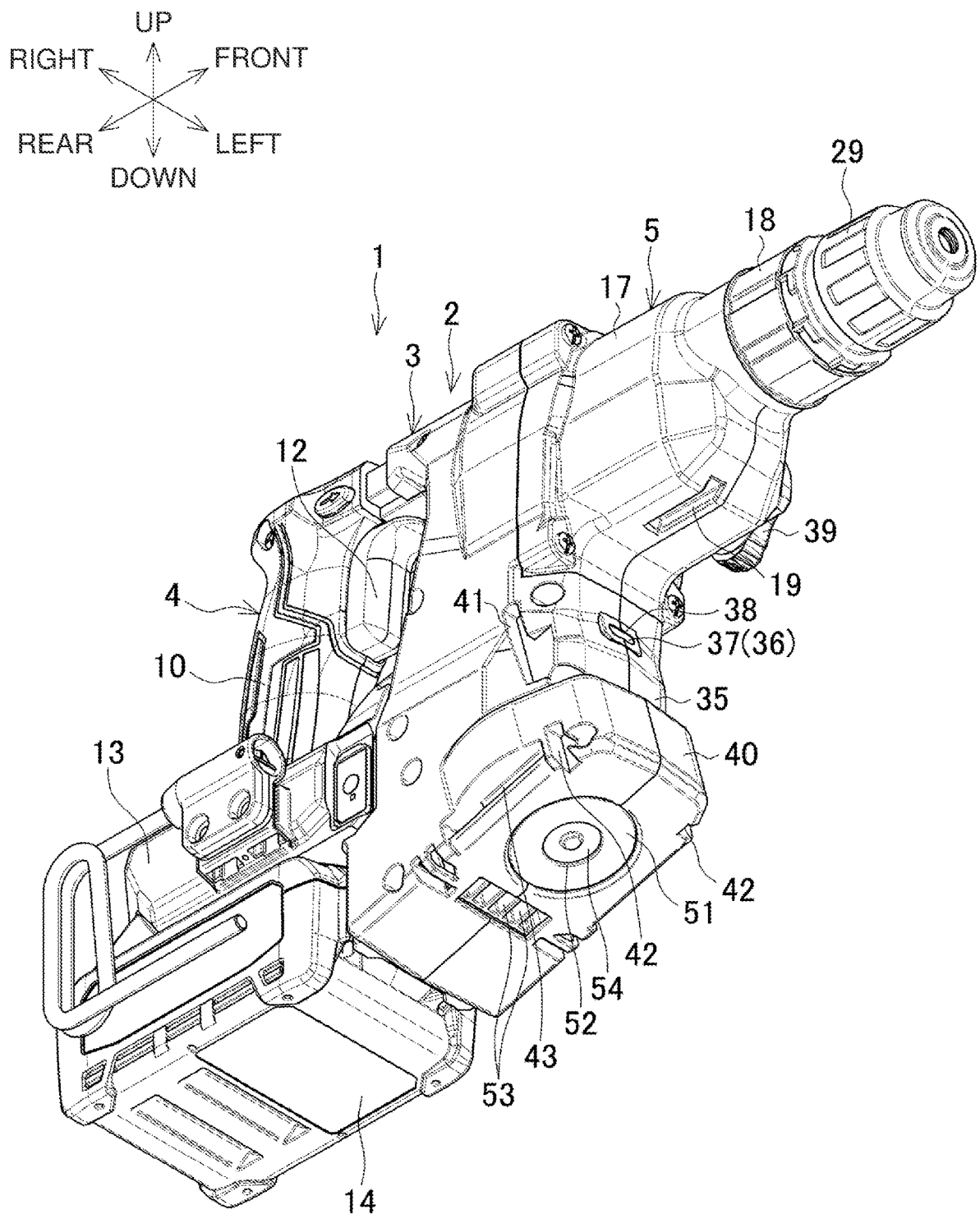
FIG. 2 is a bottom perspective view of the hammer drill.
Figure 3:
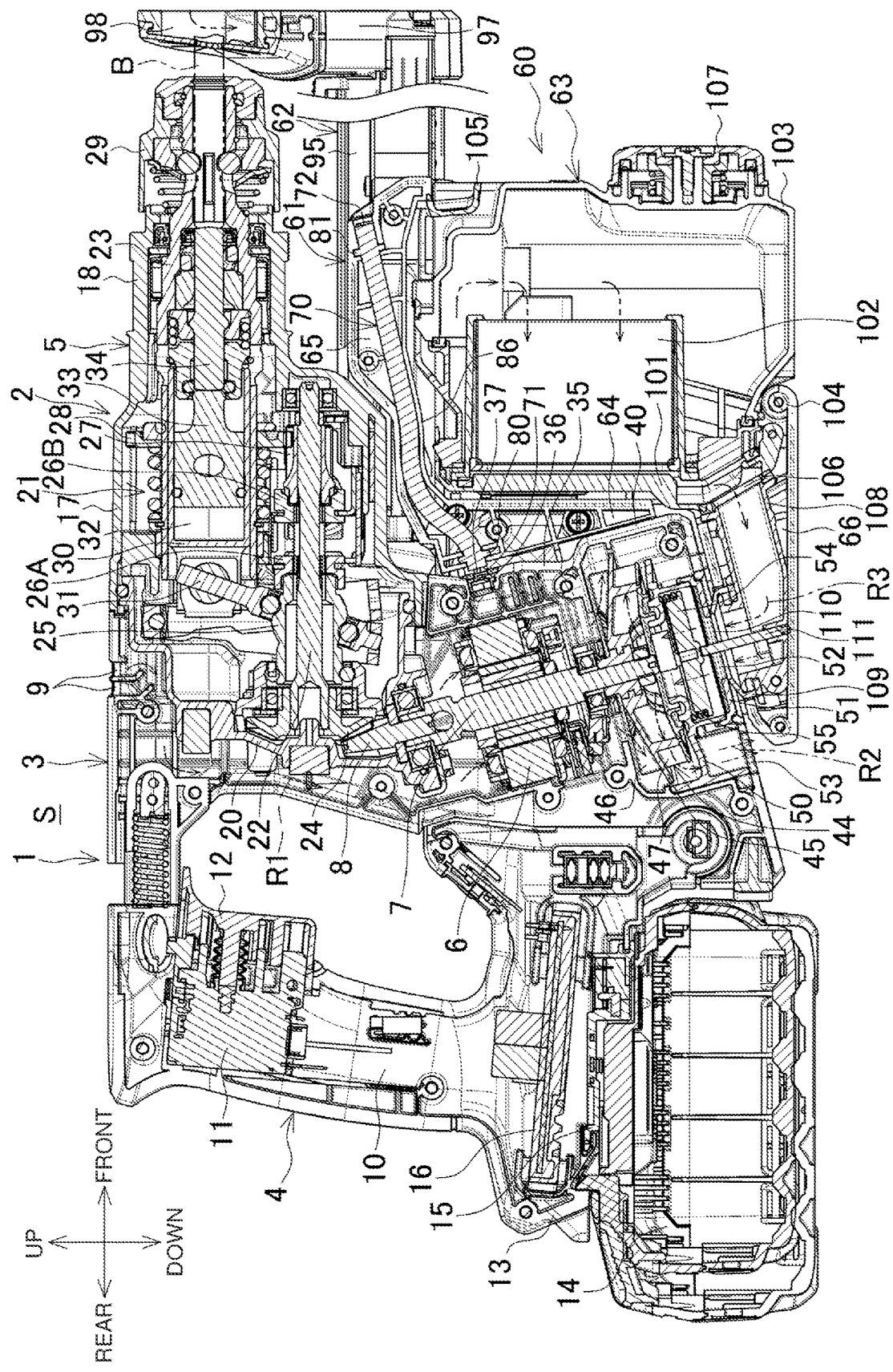
FIG. 3 is a longitudinal central sectional view of the dust collection system with the dust collection attachment attached to the hammer drill.

FIG. 1 is a front perspective view of a dust collection system S with a dust collection attachment (power tool attachment) 60 attached to a hammer drill (power tool) 1. FIG. 2 is a bottom perspective view of the hammer drill 1 with the dust collection attachment 60 removed. FIG. 3 is a longitudinal central sectional view of the dust collection system S.

The hammer drill 1 includes a housing 2 defining the outer wall. The housing 2 includes a main housing 3, a rear housing 4, and a front housing 5.

The main housing 3 accommodates a brushless motor 6 in its lower portion. The main housing 3 is connected to the front housing 5 in its upper portion. The motor 6 includes a rotation axis 7 receiving, at its upper end, a pinion 8 facing upward. The main housing 3 has multiple upper inlets 9 in the upper surface.

The rear housing 4 includes a grip 10 extending vertically. The rear housing 4 is connected to the main housing 3 in a loop. The grip 10 includes a switch 11 in its upper portion. A trigger 12 protrudes frontward from the switch 11. The grip 10 includes a battery mount 13 in its lower portion. A battery pack 14 is slidable onto the battery mount 13 from the rear. The battery mount 13 holds a terminal mount 15 electrically connected to the battery pack 14. A controller 16 is accommodated above the terminal mount 15.

The front housing 5 is hollow. The front housing 5 includes a rear hollow portion 17 and a front hollow portion 18. The rear hollow portion 17 has a substantially rectangular cross section extending vertically. The rear hollow portion 17 is fastened to the upper portion of the main housing 3 with screws from the front. The front hollow portion 18 has a circular cross section. The front hollow portion 18 is decentered upward from the rear hollow portion 17 and protrudes frontward. The rear hollow portion 17 includes a switching knob 39 for operation modes on its left side surface. As shown in FIG. 2, the rear hollow portion 17 has an engagement groove 19 extending in the front-rear direction on its lower surface. The engagement groove 19 has a front end being open frontward.

As shown in FIG. 3, the main housing 3 includes, in the upper portion, an inner housing 20 joined to the rear hollow portion 17. A striker assembly 21 is located between the front housing 5 and the inner housing 20.

The striker assembly 21 includes a countershaft 22 and a tool holder 23. The countershaft 22 and the tool holder 23 extend in the front-rear direction. The countershaft 22 is rotatably supported in lower portions of the front housing 5 and the inner housing 20. The countershaft 22 receives a first gear 24, a boss sleeve 25, two clutches 26A and 26B, and a second gear 27 in the stated order from the rear. The pinion 8 on the rotation axis 7 is placed through the inner housing 20 from below and meshes with the first gear 24.

The tool holder 23 is cylindrical. The tool holder 23 is supported, above the countershaft 22, to be rotatable coaxially with the front hollow portion 18. A third gear 28 is located in the middle of the tool holder 23. The third gear 28 meshes with the second gear 27 on the countershaft 22. The tool holder 23 has its front end protruding frontward from the front hollow portion 18. An operation sleeve 29 is located at the front end of the tool holder 23. A bit B is attachable to and detachable from the operation sleeve 29.

A piston cylinder 30 is loosely received in a rear portion of the tool holder 23 to be movable back and forth. The piston cylinder 30 receives an arm 31 connected to its rear end. The boss sleeve 25 externally holds the lower end of the arm 31 with a swash bearing having its axis tilted. The arm 31 is swingable back and forth as the boss sleeve 25 rotates. The piston cylinder 30 accommodates a striker 33 to be movable back and forth across an air chamber 32. In front of the striker 33, the tool holder 23 includes an impact bolt 34.

A cylindrical motor housing 35 is located below the front housing 5. The motor housing 35 accommodates the motor 6. The motor housing 35 is slightly tilted rearward with respect to the vertical direction with the motor 6. The motor housing 35 being tilted downward toward the front includes a light 36 on its front surface. The light 36 includes two 1.5×3 mm light-emitting diodes (LEDs) arranged laterally on a substrate with their front portions covered with a lens cover. The portions of the LEDs covered with the lens cover serve as an illuminator 37 protruding frontward. As shown in FIG. 2, the illuminator 37 is exposed inside a through-hole 38 located in the front surface of the motor housing 35 to emit light obliquely upward.

A fan compartment 40 is located below the motor housing 35. The fan compartment 40 is separate from the motor housing 35 and the battery mount 13 in the main housing 3. The fan compartment 40 has its bottom surface orthogonal to the front surface of the motor housing 35. The bottom surface is tilted downward toward the rear in a side view.

As shown in FIG. 2, the motor housing 35 has a pair of upper engagement grooves 41 on its left and right side surfaces. The upper engagement grooves 41 extend parallel to the tilting direction of the motor housing 35. The fan compartment 40 has a pair of lower engagement grooves 42 on its left and right side surfaces. Each lower engagement groove 42 is located frontward from the extension of the corresponding upper engagement groove 41. The lower engagement grooves 42 extend parallel to the tilting direction of the motor housing 35. The fan compartment 40 has a pair of fitting grooves 43 in the lower portions of its left and right side surfaces behind the lower engagement grooves 42. The fitting grooves 43 extend parallel to the tilting direction of the bottom surface of the fan compartment 40.

The rotation axis 7 has its lower end protruding into the fan compartment 40. A double fan 44 is orthogonally mounted on the lower end of the rotation axis 7 inside the fan compartment 40. The double fan 44 includes an upper motor cooling fan 46 and a lower dust collection fan 47 with a partition 45, which is circular in a plan view, in between. The motor cooling fan 46 and the dust collection fan 47 are centrifugal fans.

The fan compartment 40 includes a baffle plate 50 below the double fan 44. The baffle plate 50 is annular in a plan view and divides the fan compartment 40 horizontally. The fan compartment 40 receives a cap 51 on its bottom surface below the baffle plate 50. The cap 51 has a lower inlet 52 in its center. The cap 51 is fixed to a cylindrical portion on the lower surface of the baffle plate 50. The fan compartment 40 has bottom exhaust ports 53 in its bottom surface behind the cap 51. The bottom exhaust ports 53 connect with an upper space of the fan compartment 40 accommodating the double fan 44. The baffle plate 50 includes a shutter 54 and a coil spring 55 in its cylindrical portion. The shutter 54 is urged by the coil spring 55 to the lower limit position to close the lower inlet 52 in a normal state.

As indicated by the dashed arrows in FIG. 3, a motor cooling flow channel R1 is defined inside the main housing 3 to allow air to flow as the motor cooling fan 46 rotates. The motor cooling flow channel R1 allows air sucked in through the upper inlets 9 in the upper surface of the main housing 3 to flow through the main housing 3, between the front housing 5 and the inner housing 20, and through the motor 6. The air then enters the upper space of the fan compartment 40 and is discharged through the bottom exhaust ports 53.

As indicated by the dot-dash arrows in FIG. 3, a body dust collection flow channel R2 is defined inside the fan compartment 40 to allow air to flow as the dust collection fan 47 rotates. The body dust collection flow channel R2 allows air sucked through the lower inlet 52 into a lower space to pass through the baffle plate 50 and enter the upper space when the shutter 54 moves upward against an urging force from the coil spring 55 to open the lower inlet 52. As in the motor cooling flow channel R1, the air flows into the bottom exhaust ports 53 from radially outside the dust collection fan 47.

Figure 4:
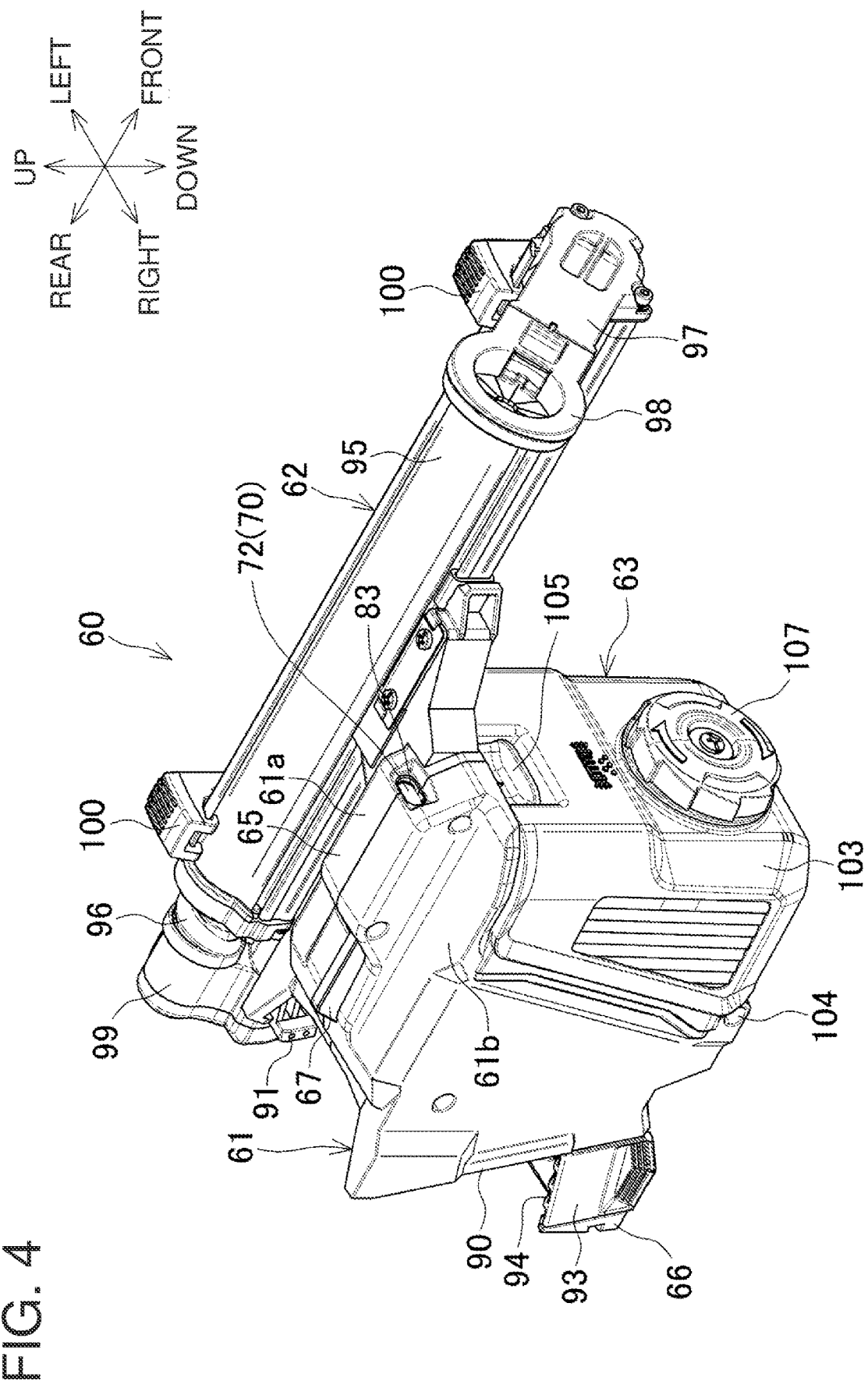
FIG. 4 is a front perspective view of the dust collection attachment.
Figure 5:
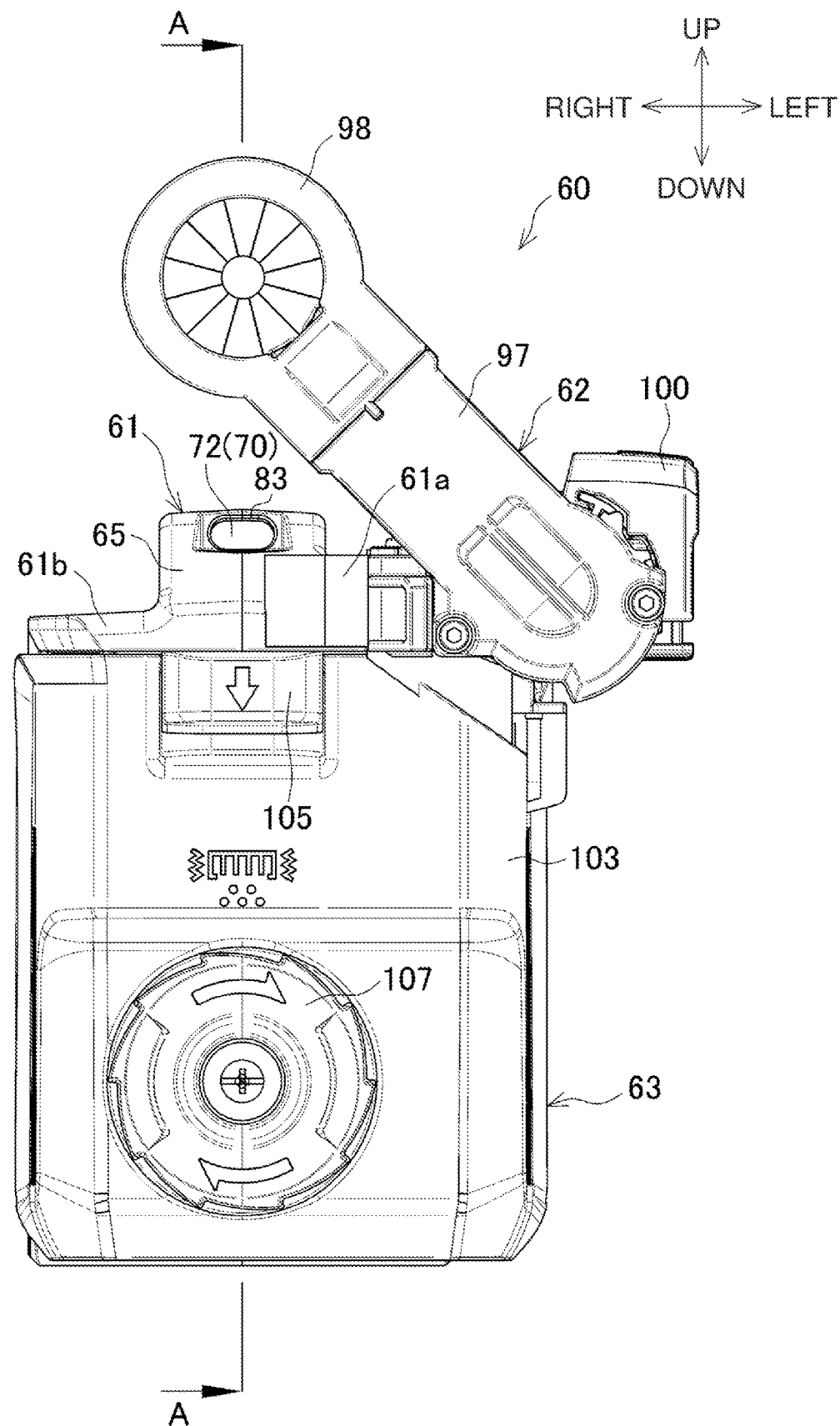
FIG. 5 is a front view of the dust collection attachment.
Figure 6:
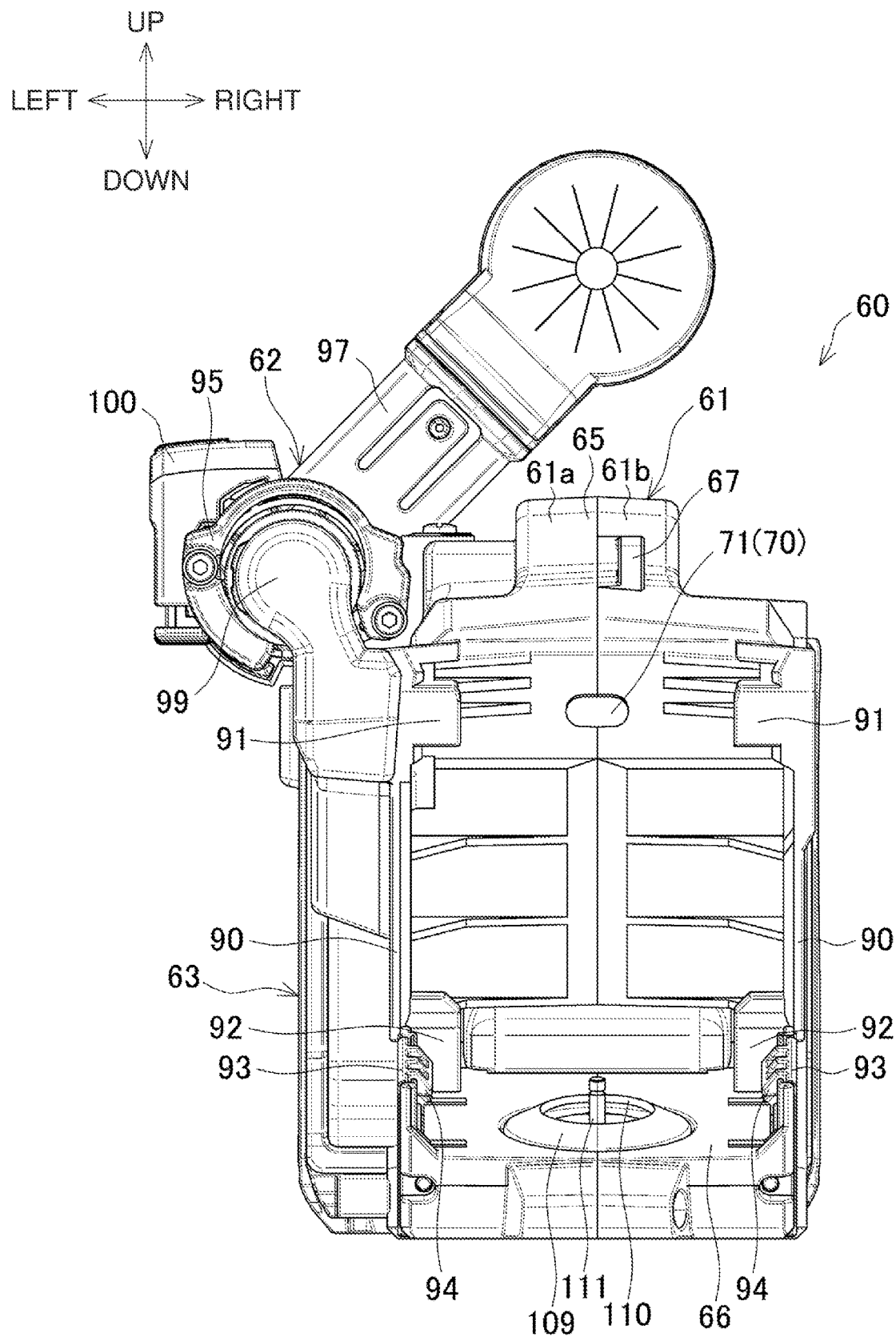
FIG. 6 is a rear view of the dust collection attachment.
Figure 7:
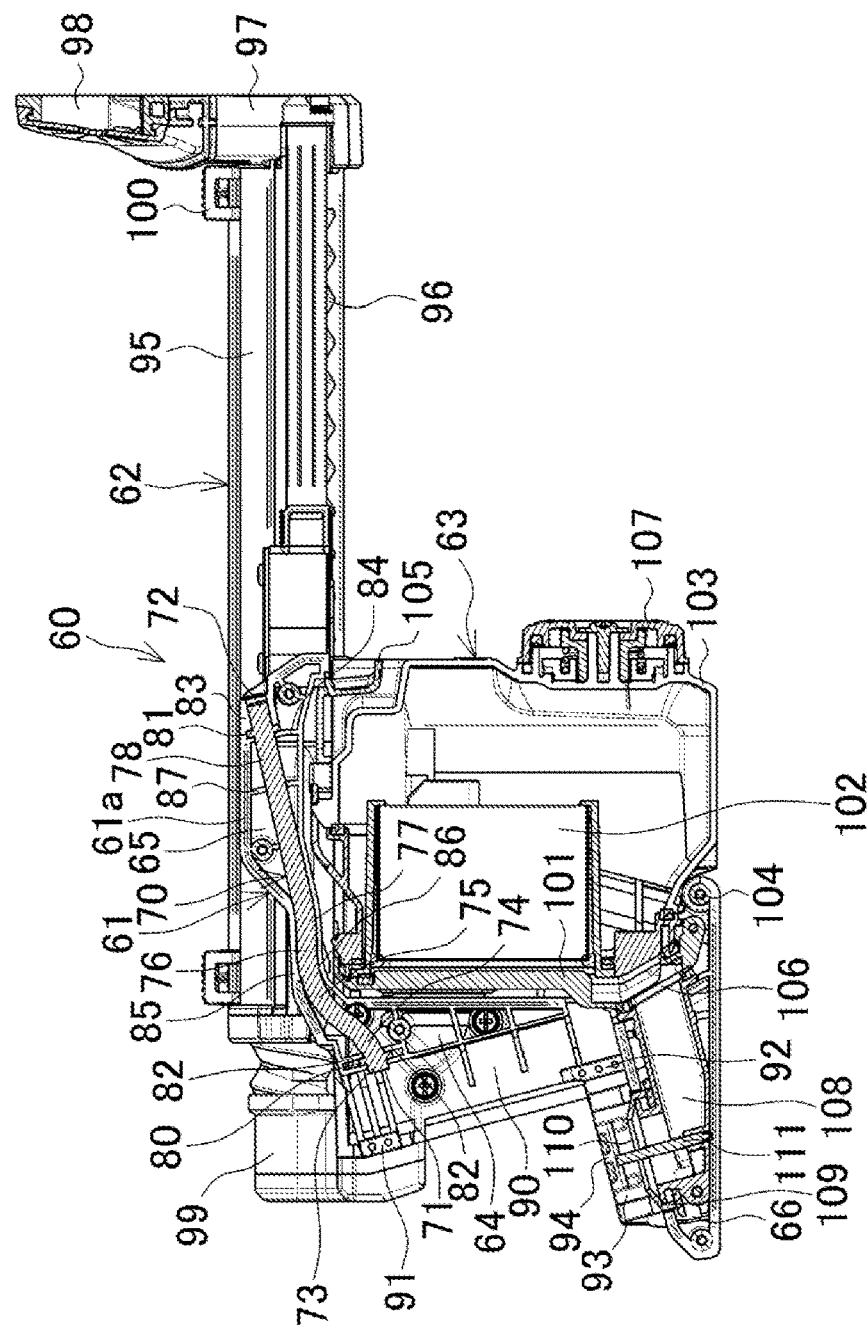
FIG. 7 is a sectional view taken along line A-A in FIG. 5.

FIG. 4 is a front perspective view of the attachment 60. FIG. 5 is a front view of the attachment 60. FIG. 6 is a rear view of the attachment 60. FIG. 7 is a sectional view taken along line A-A in FIG. 5.

The attachment 60 includes a body case 61, a slide 62, and a dust box 63.

The body case 61 includes right and left half cases 61a and 61b screwed together. The body case 61 includes a middle wall 64, an upper wall 65, and a lower wall 66. The middle wall 64 extends vertically in substantially the middle of the body case 61 in the front-rear direction. The upper wall 65 protrudes frontward from an upper portion of the middle wall 64. The lower wall 66 protrudes rearward from a lower portion of the middle wall 64. The dust box 63 is detachable from the middle wall 64 and the upper wall 65 from the front. The upper wall 65 includes an engagement rail 67 extending rearward and protruding from its rear upper surface.

The rear surface of the middle wall 64 is aligned with the front surface of the motor housing 35. The upper surface of the lower wall 66 is aligned with the bottom surface of the fan compartment 40. The rear surface of the middle wall 64 is thus tilted rearward with respect to the vertical direction. The upper surface of the lower wall 66 is tilted downward toward the rear. The motor housing 35 is fittable with the fan compartment 40.

Figure 8:
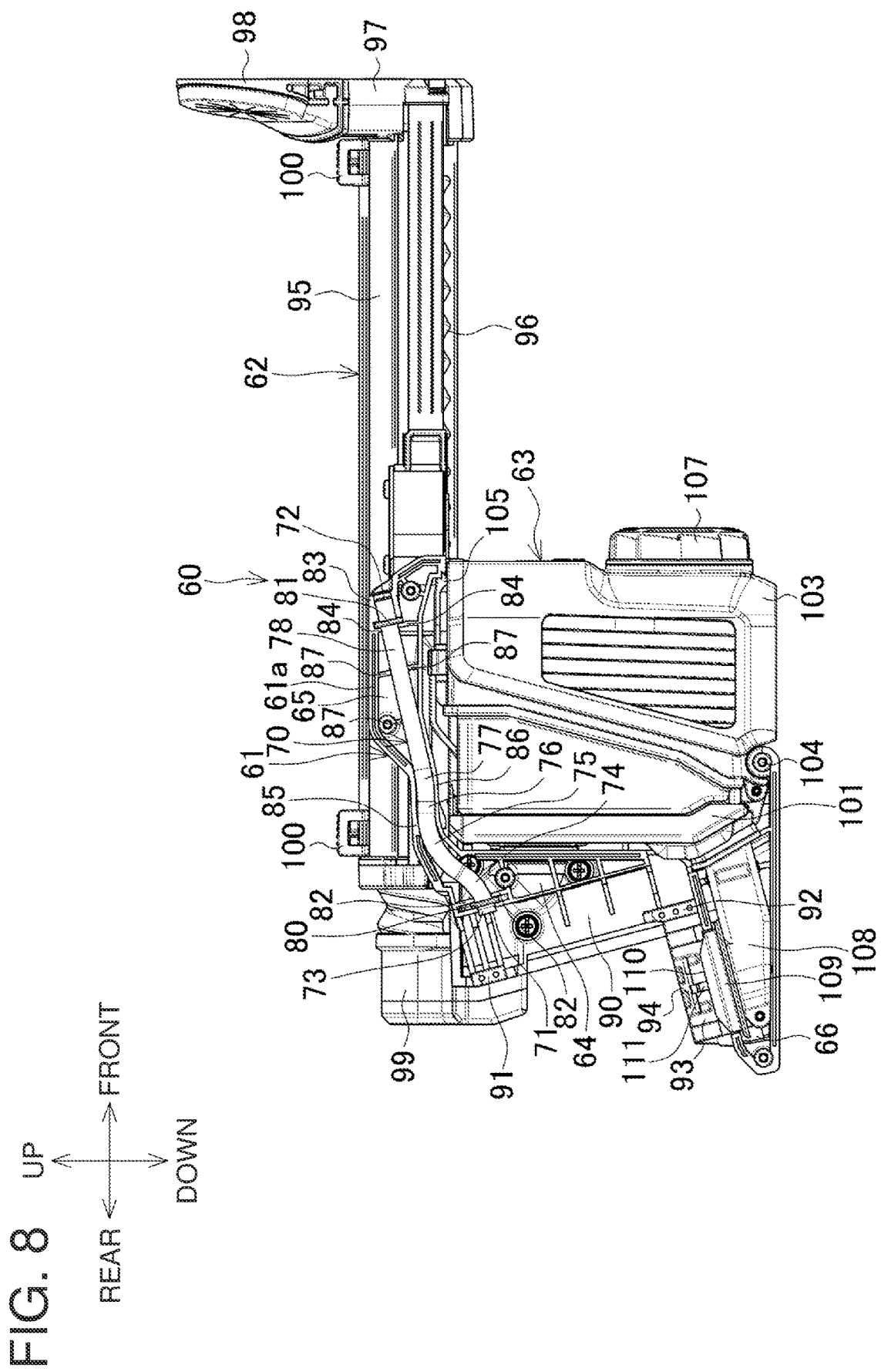
FIG. 8 is a side view of the dust collection attachment with a right half case removed.

As shown in FIGS. 7 and 8, a light guide 70 is accommodated across the upper portion of the middle wall 64 and the upper wall 65. The light guide 70 is made of a transparent acrylic resin. The light guide 70 is a rod extending in the front-rear direction. The light guide 70 has, except a rear flange 80 and a front flange 81 described later, a laterally elongated elliptic cross section across its length. The light guide 70 has an elliptic cross section, or more specifically, with a thickness of 6 mm in the short-side direction, a width of 12 mm in the long-side direction, and a radius of 2 mm. The light guide 70 has a larger area of the cross section than the illuminator 37 in the light 36.

A light receiver 71 located at the rear end of the light guide 70 is exposed to the rear surface of the middle wall 64. A light emitter 72 located at the front end of the light guide 70 is exposed to the front surface of the upper wall 65. The light guide 70 is accommodated in the middle wall 64 and the upper wall 65 with the light receiver 71 and the light emitter 72 positioned relative to each other. The light guide 70 is thus partially curved rather than extending linearly. As shown in FIGS. 9 to 11C, the light guide 70 includes a short first linear portion 73, a first curved portion 74, a second curved portion 75, a short second linear portion 76, a third curved portion 77, and a long third linear portion 78 in the stated order from its rear end. The first curved portion 74 has a lower surface having a bend radius of 23 mm (hereafter denoted as R23) and is curved downward. The second curved portion 75 has a lower surface having a bend radius of R21 and is curved upward. The third curved portion 77 has a lower surface having a bend radius of R53 and is curved downward. Each of the curved portions 74, 75, and 77 has a radius greater than or equal to 3 times the thickness (6 mm).

The rear flange 80 extends along the entire periphery of the light guide 70 between the first linear portion 73 and the first curved portion 74. The rear flange 80 has an elliptic cross section larger than the first linear portion 73 and the first curved portion 74. The front flange 81 is located along the entire periphery of the light guide 70 at the front of the third linear portion 78. The front flange 81 has an elliptic cross section larger than the third linear portion 78.

Figure 9:
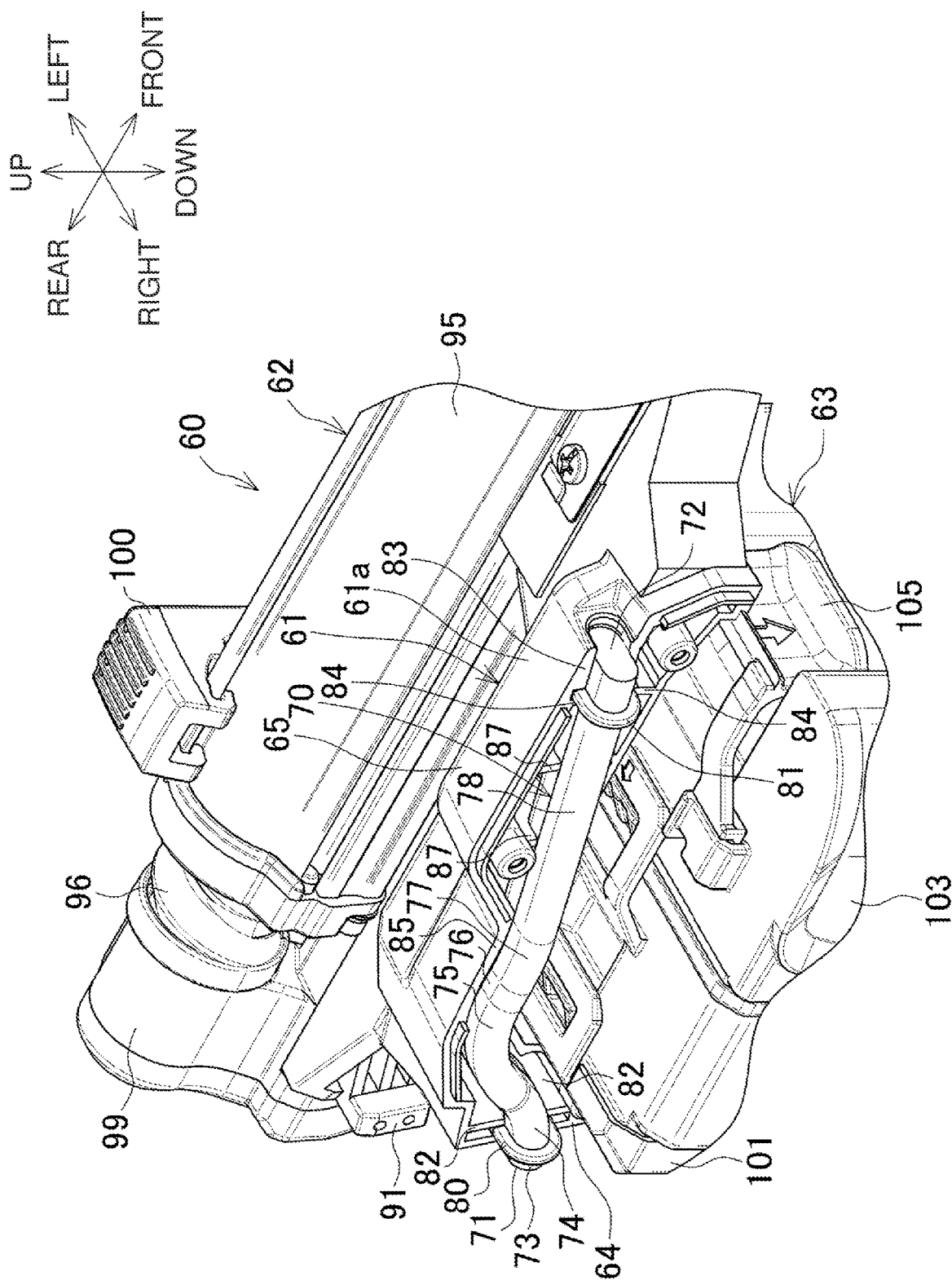
FIG. 9 is an enlarged perspective view of the dust collection attachment with the right half case removed as viewed from the front.
Figure 10:
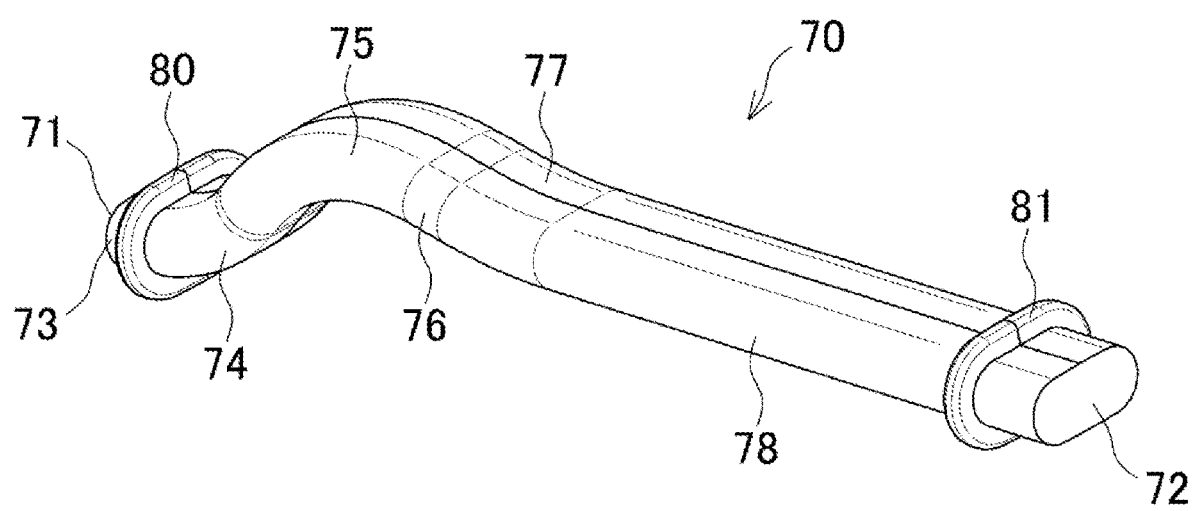
FIG. 10 is a perspective view of a light guide.
Figure 11A:
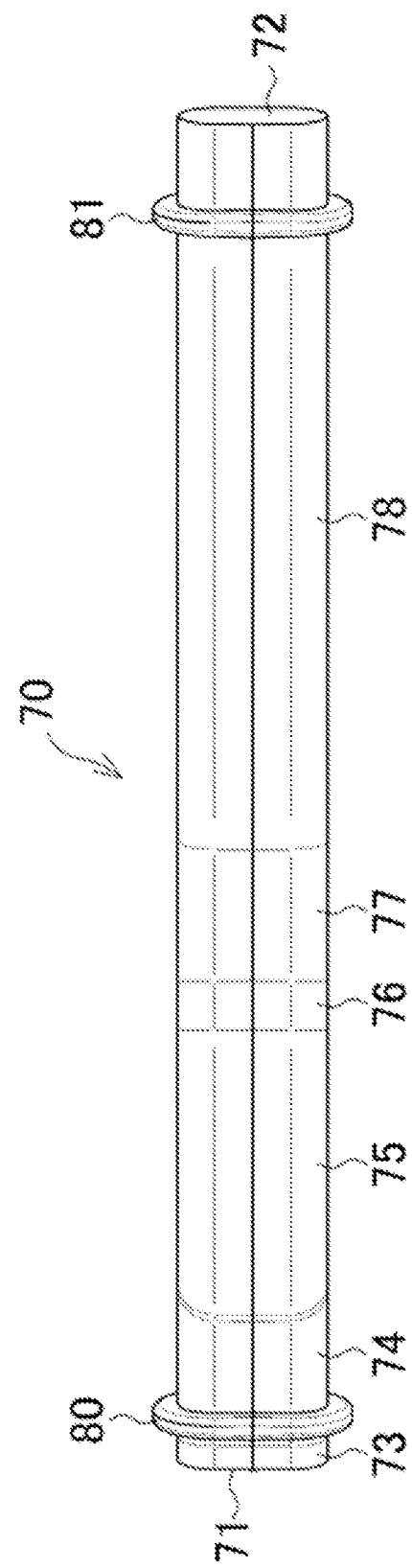
FIG. 11A is a plan view of the light guide.
Figure 11B:
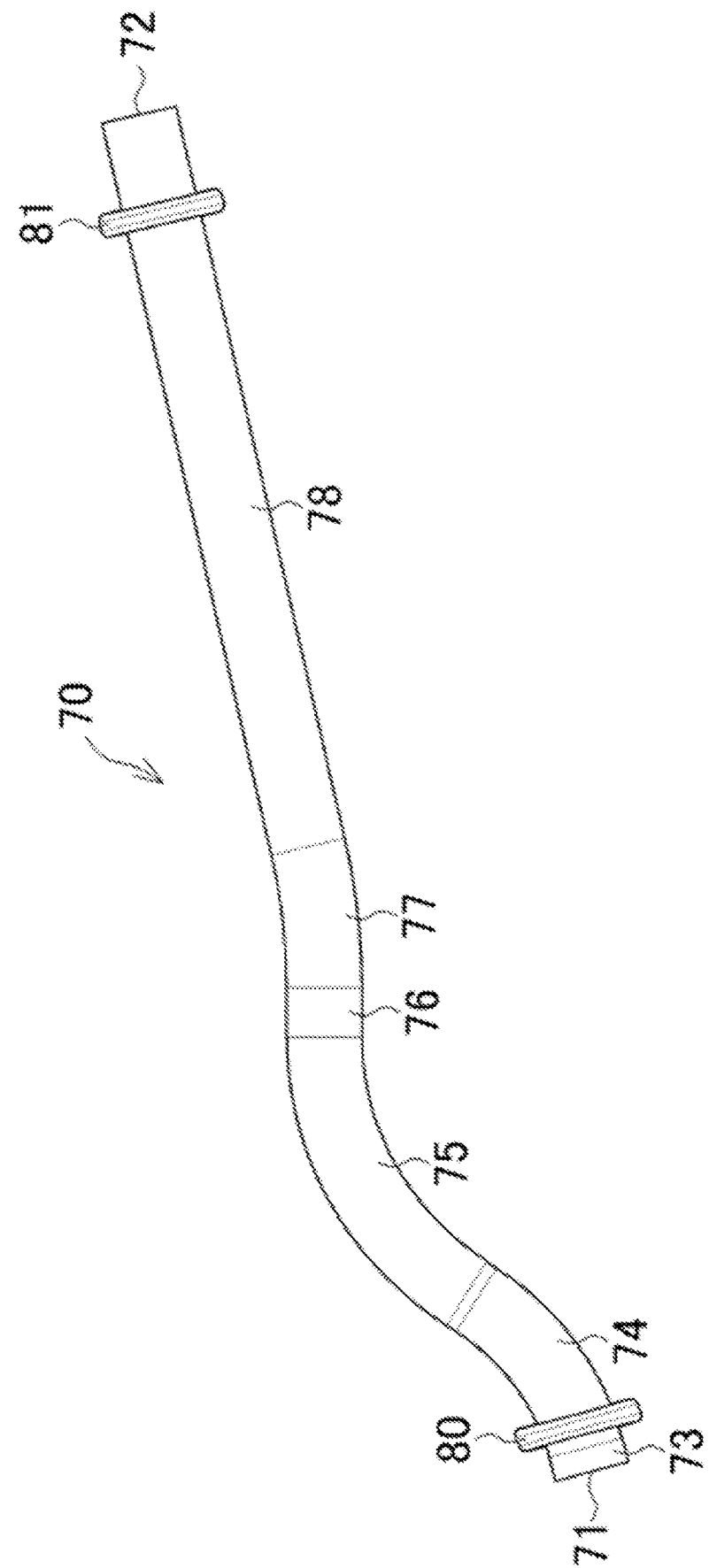
FIG. 11B is a side view of the light guide.
Figure 11C:
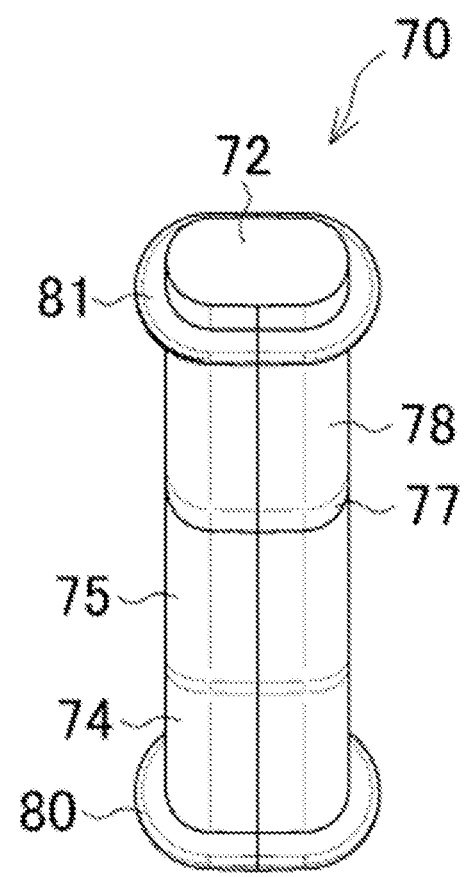
FIG. 11C is a front view of the light guide.

As shown in FIGS. 7 to 9, the middle wall 64 includes rear ribs 82 at its rear. The rear ribs 82 hold the first curved portion 74 from the top and the bottom in front of the rear flange 80.

The upper wall 65 includes a hollow portion 83 at its front. The hollow portion 83 receives, in front of the front flange 81, a front portion of the third linear portion 78. The upper wall 65 includes front ribs 84 on the upper and lower inner surfaces. The front ribs 84 hold the third linear portion 78 from the top and the bottom behind the front flange 81.

The upper wall 65 includes an upper presser 85 on its upper inner surface between the rear ribs 82 and the front ribs 84. The upper presser 85 is in contact with and extends continuously along the upper surfaces of the second curved portion 75, the second linear portion 76, the third curved portion 77, and the third linear portion 78 of the light guide 70. The upper wall 65 includes a lower presser 86 on its lower inner surface between the rear ribs 82 and the front ribs 84. The lower presser 86 is in contact with and extends continuously along the lower surfaces of the second curved portion 75, the second linear portion 76, the third curved portion 77, and the third linear portion 78.

The upper wall 65 includes middle ribs 87 in front of the upper presser 85 and the lower presser 86. The middle ribs 87 are in contact with the upper and lower surfaces of the third linear portion 78.

The light guide 70 is positioned without a backlash to face obliquely upward in the upper portion of the middle wall 64 and in the upper wall 65 with the right and left half cases 61a and 61b joined together. In the positioning state, the light receiver 71 slightly protrudes rearward from the rear surface of the middle wall 64. The light emitter 72 is exposed obliquely upward in the hollow portion 83 on the front surface of the upper wall 65.

The middle wall 64 is integral with a pair of right and left side plates 90 on its right and left. The side plates 90 protrude rearward. The pair of side plates 90 are tilted rearward at the rear edges in parallel with the rear surface of the middle wall 64. The pair of side plates 90 include, as shown in FIGS. 6 to 8, a pair of right and left upper ridges 91 on the upper surfaces opposite from each other. The upper ridges 91 are tilted in parallel with the rear edges. The pair of side plates 90 include a pair of right and left lower ridges 92 on the lower surfaces opposite from each other. The lower ridges 92 are located frontward from the extensions of the upper ridges 91. The upper ridges 91 are aligned with the upper engagement grooves 41 on the motor housing 35. The lower ridges 92 are aligned with the lower engagement grooves 42 on the fan compartment 40.

The lower wall 66 includes a pair of right and left hook plates 93 on its right and left sides. Each hook plate 93 is supported on a pin (not shown) as a pivot located in its lower portion to have its upper and lower ends laterally swingable. Each hook plate 93 includes, at its upper end, a tab 94 protruding inward. The tabs 94 are aligned with the fitting grooves 43 in the right and left lower portions of the fan compartment 40. Each hook plate 93 is urged rotationally in the direction in which its upper end is swung inward by a torsion spring (not shown).

The slide 62 includes a slide cylinder 95 and a flexible hose 96. The slide cylinder 95 is held on the left of the upper wall 65 to be movable back and forth. A nozzle 97 including a suction port 98 at its upper end is orthogonally mounted on the distal end of the slide cylinder 95. The suction port 98 is located above and in front of the upper wall 65 and is located in the middle in the lateral direction.

The flexible hose 96 is loosely received in the slide cylinder 95. The flexible hose 96 has a front end connected to the basal end of the nozzle 97. The flexible hose 96 has a rear end connected to the upstream end of a duct 99 protruding into a left rear portion of the body case 61. The flexible hose 96 integrally includes a spiral wire. The flexible hose 96 is compressed between the nozzle 97 and the duct 99, and urges the slide cylinder 95 forward. The slide cylinder 95 is controllable between an advanced position and a retracted position with a stopper 100 on the side surface of the slide cylinder 95.

The duct 99 has a downstream end having, in the middle wall 64, an opening connecting with an inlet (not shown) in the dust box 63. The dust box 63 includes, as shown in FIG. 7, a lid 101 and a box body 103. The lid 101 includes a filter 102. The box body 103 is hinged together with the lid 101 and covers the filter 102 from the front. The lower surface of the box body 103 is fitted with a receiving shaft 104 located at the front end of the lower wall 66. A hanging tab 105 protruding frontward from the box body 103 is elastically fitted with the front end of the upper wall 65. The dust box 63 is thus attached. The lid 101 has an outlet 106 in its lower portion. Air passed through the filter 102 is discharged through the outlet 106. The box body 103 receives a vibration generator 107 on its front surface. The vibration generator 107 is rotated to vibrate the box body 103 to remove dust on the filter 102.

The lower wall 66 includes an exhaust pipe 108. The exhaust pipe 108 has a front end connecting with the outlet 106. The exhaust pipe 108 is a hollow rectangular prism extending rearward in the lower wall 66 and then bending upward. The exhaust pipe 108 has its upper rear end covered with a rubber cap 109. The rubber cap 109 includes an upper portion tapered with its diameter decreasing upward. The rubber cap 10) has an exhaust port 110 in its center. The exhaust port 110 protrudes upward from the lower wall 66. The exhaust port 110 includes a pin 111 protruding upward in its lower portion at the rear end of the exhaust pipe 108. The pin 111 extends through the center of the exhaust port 110 and protrudes upward from the rubber cap 109.

The attachment 60 includes, as indicated by the two-dot-dash arrows in FIG. 3, an attachment dust collection flow channel R3. The attachment dust collection flow channel R3 allows the entry of air through the suction port 98 to pass through the nozzle 97, the flexible hose 96, and the duct 99, and then into the dust box 63. The air passes through the filter 102, enters the exhaust pipe 108 through the outlet 106, and is discharged upward through the exhaust port 110.

The lower wall 66 is positioned in front of and obliquely downward from the fan compartment 40 when the attachment 60 is attached to the hammer drill 1. At the same time, the upper ridges 91 on the side plates 90 are positioned in front of and obliquely downward from the upper engagement grooves 41 on the motor housing 35, and the lower ridges 92 are positioned in front of and obliquely downward from the lower engagement grooves 42. In this setting position, the engagement rail 67 is located in front of and obliquely downward from the engagement groove 19. The rubber cap 109 and the pin 111 in the lower wall 66 are located in front of and obliquely downward from the shutter 54 sealing the lower inlet 52.

The attachment 60 is then slid backward and obliquely upward, or the hammer drill 1 is slid forward and obliquely downward. The upper ridges 91 moving relative to the hammer drill 1 then engage with the upper engagement grooves 41 from below. The lower ridges 92 engage with the lower engagement grooves 42 from below. With the relative movement of the attachment 60, the engagement rail 67 also engages with the engagement groove 19 from below.

When the attachment 60 reaches the attachment position, the tabs 94 on the hook plates 93 in the lower wall 66 are fitted with the left and right fitting grooves 43 on the fan compartment 40.

With the relative movement of the attachment 60, the pin 111 in contact with the shutter 54 pushes up the shutter 54 against the urging force from the coil spring 55. As shown in FIG. 3, when the lower inlet 52 is open, the rubber cap 109 comes in contact with the lower surface of the cap 51 and elastically deforms to seal between the lower inlet 52 and the exhaust port 110.

The dust collection system S can thus include the attachment 60 attached to have restricted vertical and lateral movements with respect to the hammer drill 1. In this state, the attachment dust collection flow channel R3 connects with the body dust collection flow channel R2.

The illuminator 37 in the light 36 has its front covered with the middle wall 64 in the attachment 60. However, the light receiver 71 in the light guide 70 faces and is adjacent to the illuminator 37. The illuminator 37 has a front surface at a proximity of 2 to 3 mm from the light receiver 71. The area of the light receiver 71 corresponds to an area of a circle having a diameter 2 to 3 times the proximity (e.g., a diameter of 6 mm).

In the dust collection system S, the tip of the bit B is placed in the suction port 98 by pressing the suction port 98 of the attachment 60 against a target surface of a workpiece. The trigger 12 in the hammer drill 1 is then pressed. The switch 11 is turned on to cause the controller 16 to drive the motor 6. The rotation axis 7 and the countershaft 22 rotate with the pinion 8. The switching knob 39 on the side surface of the front housing 5 is operable to slide the clutches 26A and 26B. A drill mode, a hammer mode, or a hammer drill mode can be selected. In the drill mode, the clutch 26B alone engages with the second gear 27. In the hammer mode, the clutch 26A alone engages with the boss sleeve 25. In the hammer drill mode, the clutch 26B engages with the second gear 27, and the clutch 26A engages with the boss sleeve 25. In the drill mode, the tool holder 23 rotates with the third gear 28 to rotate the bit B. In the hammer mode, the arm 31 swings to cause the piston cylinder 30 to reciprocate. The striker 33 thus reciprocates across the air chamber 32. The striker 33 then strikes the bit B with the impact bolt 34. In the hammer drill mode, the tool holder 23 rotates and the impact bolt 34 performs striking at the same time.

With the suction port 98 positioned for operation, the hammer drill 1 is moved forward to move the nozzle 97 and the slide cylinder 95 backward. The bit B thus passes through the suction port 98 for machining the workpiece.

The double fan 44 and the rotation axis 7 rotate at the same time. As the motor cooling fan 46 rotates, air flows into the motor cooling flow channel R1. The air sucked in through the upper inlets 9 passes through and cools the main housing 3, the front housing 5, and the motor 6 in the stated order. The cooled air enters the fan compartment 40 and is discharged through the bottom exhaust ports 53.

The dust collection fan 47 rotates to allow air to flow through the attachment dust collection flow channel R3 and the body dust collection flow channel R2. In other words, the air sucked through the suction port 98 with a suction force passes through the flexible hose 96, the duct 99, the dust box 63, and the exhaust pipe 108 in the stated order, enters the fan compartment 40 through the lower inlet 52, and is discharged through the bottom exhaust ports 53.

Thus, dust from the workpiece is sucked through the suction port 98, enters the dust box 63 through the nozzle 97, the flexible hose 96, and the duct 99, is caught by the filter 102, and is stored into the box body 103.

When the switch 11 is turned on, the controller 16 supplies power to the light 36 to turn on the illuminator 37. The light emitted from the illuminator 37 is received by the light receiver 71 in the light guide 70 facing the illuminator 37. The received light is transmitted forward while being reflected in the light guide 70 and is output obliquely forward from the light emitter 72. The light guide 70 is formed from a transparent acrylic resin and is elliptic across its length. Each of the curved portions 74, 75, and 77 has a radius greater than or equal to 3 times the thickness. This structure thus reduces the light transmission loss, allowing light from the light receiver 71 to be efficiently guided to the light emitter 72.

To detach the attachment 60, the tabs 94 are disengaged from the fitting grooves 43 with the lower ends of the right and left hook plates 93 in the lower wall 66 held together. The attachment 60 is then slid obliquely downward, or the hammer drill 1 is slid obliquely upward. The upper ridges 91 are then disengaged downward from the upper engagement grooves 41. The lower ridges 92 are disengaged downward from the lower engagement grooves 42. At the same time, the engagement rail 67 is disengaged downward from the engagement groove 19. The attachment 60 is thus separate from the hammer drill 1.

The dust stored in the box body 103 in the dust box 63 can be discarded by removing the dust box 63 from the attachment 60 and opening the lid 101.

The attachment 60 according to the embodiment is attachable to the hammer drill 1 having the light 36 (an example of a light source) to cover the light 36.

The attachment 60 includes the light guide 70 including the light receiver 71 that receives light from the light 36 when the attachment 60 is attached to the hammer drill 1, and the light emitter 72 that outputs the received light. The light guide 70 is a single member made of a transparent resin.

This structure efficiently guides light and provides sufficient illumination when attached to the hammer drill 1.

The distance between the illuminator 37 in the light 36 and the light receiver 71 is less than or equal to 5 mm.

Light from the illuminator 37 can thus be received by the light receiver 71 without escape of the light.

The light receiver 71 has an area substantially equal to a circle having a diameter 2 to 3 times the distance between the illuminator 37 and the light receiver 71.

The light guide 70 can have an appropriate thickness to reduce the likelihood that the reflected light travels an unexpectedly long distance.

The light guide 70 includes the first curved portion 74, the second curved portion 75, and the third curved portion 77 (examples of a curved portion). Each of the curved portions 74, 75, and 77 has a bend radius greater than or equal to 1.5 times the thickness of the light guide 70.

The transmission loss of the light guided to the light emitter 72 can be reduced when the curved portions are included.

Each of the curved portions 74, 75, and 77 has a bend radius greater than or equal to 3 times the thickness of the light guide 70.

This reduces the light transmission loss more efficiently.

The light guide 70 has a cross section including no corner formed between flat surfaces.

This eliminates the light transmission loss caused by such corners.

The light guide 70 has the same cross section across its length from the light receiver 71 to the light emitter 72.

Light from the light receiver 71 can be efficiently guided to the light emitter 72 with reduced loss of the light.

The light guide 70 includes the first linear portion 73, the second linear portion 76, and the third linear portion 78 (examples of a linear portion). Each of the linear portions 73, 76, and 78 includes the rear flange 80 and the front flange 81 for positioning (examples of a flange) on a portion other than the light receiver 71 and the light emitter 72.

The light guide 70 may have a reduced backlash caused by vibration. The light receiver 71 and the light emitter 72 without the rear flange 80 and the front flange 81 can avoid a decrease in efficiency of light guiding caused by the flanges.

The light guide 70 is formed from an acrylic resin.

A single transparent light guide 70 can be formed easily.

Modifications of the present disclosure will now be described.

The light guide may have a cross section not limited to the elliptic cross section as in the above embodiment. The cross section may be circular or in any other shape without any corner formed between the flat surfaces. The cross section may be square, rectangular, or polygonal with rounded corners.

The position and the length of the linear portion of the light guide can be changed as appropriate for the accommodating space of the attachment. The light guide may be linear across its length.

The position, the length, and the bend radius of the curved portion of the light guide can be changed as appropriate for the accommodating space of the attachment. The light guide may be curved across its length.

The positioning flange may include three or more flanges, rather than the front and rear flanges as in the above embodiment. A single flange may be located in the front, rear, or middle portion. The flanges may be eliminated when the light guide can be positioned.

The light guide may be formed from a single transparent resin other than an acrylic resin.

The light guide may not have the same cross section across its length from the light receiver to the light emitter. For example, the light guide may have a cross section decreasing from the light receiver toward the light emitter or a cross section increasing from the light receiver toward the light emitter. The light guide may have a cross section partially decreasing or increasing, rather than across its length.

The light guide is not limited to a single light guide as in the above embodiment. The light guide may include multiple light guides.

The structure of the attachment is not limited to the structure in the above embodiment. For example, the position of the light guide may not be limited to the middle in the lateral direction but may be changed as appropriate for the position of the light source of, for example, a hammer drill with the attachment.

The structure for attaching the attachment may not be limited to the structure in the above embodiment in which the attachment is attachable and detachable in the tilting direction. For example, the attachment may be attachable to and detachable from the hammer drill from the front or from the bottom.

The attachment may incorporate the dust collection motor, the dust collection fan, and the dust collection controller, and may be attached to the hammer drill. The attachment may obtain power from, for example, the hammer drill and automatically collect dust with the dust collection controller to drive the dust collection motor.

The attachment may not include a vibration generator.

The attachment is not limited to a dust collection attachment. The present disclosure is applicable to an attachment attachable to a power tool including a light source and the attachment that covers the light source.

The striker assembly in the hammer drill is not limited to the structure in the embodiment. The motor may be any motor other than a brushless motor.

The motor may not have the rotation axis tilted as in the above embodiment. For example, the motor may have the rotation axis in the vertical direction or the front-rear direction.

The dust collection fan may not be a double fan but may be separate from the motor cooling fan. The dust collection fan may be located above the motor.

The power tool according to one or more embodiments of the present disclosure may not be the hammer drill as in the above embodiment and may be another power tool such as an electric hammer or an air tool. The power tool may be an alternating current (AC) tool rather than a direct current (DC) tool.

REFERENCE SIGNS LIST 1 hammer drill
2 housing
6 motor
7 rotation axis
9 upper inlet
16 controller
21 striker assembly
23 tool holder
35 motor housing
36 light
37 illuminator
38 through-hole
40 fan compartment
44 double fan
46 motor cooling fan
47 dust collection fan
52 lower inlet
53 bottom exhaust port
60 dust collection attachment
61 body case
62 slide
63 dust box
64 middle wall
65 upper wall
66 lower wall
70 light guide
71 light receiver
72 light emitter
73 first linear portion
74 first curved portion
75 second curved portion
76 second linear portion
77 third curved portion
78 third linear portion
80 rear flange
81 front flange
82 rear rib
84 front rib
95 slide cylinder
98 suction port
102 filter
110 exhaust port
R1 motor cooling flow channel
R2 body, dust collection flow channel
R3 attachment dust collection flow channel

What is claimed is:

1. A power tool attachment attachable to a power tool to cover a light source included in the power tool, the power tool attachment comprising:
    a body case;
    a dust box detachably attached to the body case; and
    a light guide disposed in the body case, the light guide being a single member made of a transparent resin, the light guide including
        a light receiver configured to receive light from the light source when the power tool attachment is attached to the power tool,
        a light emitter configured to output the received light, and
        a curved portion configured to accommodate the dust box.

2. The power tool attachment according to claim 1, wherein a distance between the light source and the light receiver is less than or equal to 5 mm.

3. The power tool attachment according to claim 2, wherein the light receiver has an area substantially equal to an area of a circle having a diameter 2 to 3 times the distance between the light source and the light receiver.

4. The power tool attachment according to claim 3, wherein
    the light guide includes the curved portion with a bend radius greater than or equal to 1.5 times a thickness of the light guide.

5. The power tool attachment according to claim 3, wherein the light guide has a cross section including no corner formed between flat surfaces.

6. The power tool attachment according to claim 3, wherein
    the light guide has a same cross section across a length from the light receiver to the light emitter.

7. The power tool attachment according to claim 2, wherein
    the light guide includes the curved portion with a bend radius greater than or equal to 1.5 times a thickness of the light guide.

8. The power tool attachment according to claim 2, wherein the light guide has a cross section including no corner formed between flat surfaces.

9. The power tool attachment according to claim 2, wherein the light guide has a same cross section across a length from the light receiver to the light emitter.

10. The power tool attachment according to claim 1, wherein
    the light guide includes the curved portion with a bend radius greater than or equal to 1.5 times a thickness of the light guide.

11. The power tool attachment according to claim 10, wherein the curved portion has a bend radius greater than or equal to 3 times the thickness of the light guide.

12. The power tool attachment according to claim 11, wherein the light guide has a cross section including no corner formed between flat surfaces.

13. The power tool attachment according to claim 11, wherein
    the light guide has a same cross section across a length from the light receiver to the light emitter.

14. The power tool attachment according to claim 10, wherein the light guide has a cross section including no corner formed between flat surfaces.

15. The power tool attachment according to claim 10, wherein
    the light guide has a same cross section across a length from the light receiver to the light emitter.

16. The power tool attachment according to claim 1, wherein the light guide has a cross section including no corner formed between flat surfaces.

17. The power tool attachment according to claim 1, wherein
    the light guide has a same cross section across a length from the light receiver to the light emitter.

18. The power tool attachment according to claim 1, wherein
    the light guide includes a linear portion, and
    the linear portion includes a positioning flange on a portion other than the light receiver and the light emitter.

19. The power tool attachment according to claim 1, wherein
the light guide comprises an acrylic resin.

20. A dust collection system, comprising:
a power tool including a light source; and
the power tool attachment according to claim 1 attachable to the power tool to cover the light source.

* * * * *